United States Patent
Patel

(10) Patent No.: US 7,197,290 B2
(45) Date of Patent: Mar. 27, 2007

(54) METHOD FOR AM BAND INTERFERENCE SUPPRESSION VIA FREQUENCY SHIFT

(75) Inventor: Vipul M. Patel, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 504 days.

(21) Appl. No.: 10/665,795

(22) Filed: Sep. 18, 2003

(65) Prior Publication Data

US 2005/0064842 A1 Mar. 24, 2005

(51) Int. Cl.
*H04B 1/10* (2006.01)

(52) U.S. Cl. .............. 455/296; 455/343.1; 455/345

(58) Field of Classification Search ............ 455/345, 455/296, 348, 297, 298, 343.1, 343.5, 222, 455/113, 255, 127.3

See application file for complete search history.

(56) References Cited

U.S. PATENT DOCUMENTS

| | | | | |
|---|---|---|---|---|
| 4,403,350 A | * | 9/1983 | Imai et al. ................ | 455/297 |
| 4,879,758 A | * | 11/1989 | DeLuca et al. ............ | 455/296 |
| 5,519,889 A | * | 5/1996 | Hipp ......................... | 455/297 |
| 6,147,938 A | * | 11/2000 | Ogawa et al. ............. | 455/348 |
| 7,003,270 B2 | * | 2/2006 | Maruo et al. .............. | 455/113 |
| 7,020,549 B2 | * | 3/2006 | Nakaya et al. ............ | 455/255 |
| 2003/0036415 A1 | * | 2/2003 | Shimodaira et al. ...... | 455/343 |
| 2005/0136871 A1 | * | 6/2005 | Patel ......................... | 455/222 |

* cited by examiner

*Primary Examiner*—Lana Le
(74) *Attorney, Agent, or Firm*—Timothy J. Marsh

(57) ABSTRACT

Methods are provided for suppressing interference in a motor vehicle radio such as an AM radio from the operating frequency or the harmonics of the operating frequency of a source of time varying signal such as a switching power supply in response to tuning the radio to a selected frequency. The method comprises the steps of communicating the selected frequency to the source of time varying signal, comparing the selected frequency to the operating frequency and to the harmonics of that operating frequency, and adjusting the operating frequency if the operating frequency or any of the harmonics of the operating frequency fall within a predetermined interference range of the selected frequency.

18 Claims, 2 Drawing Sheets

METHOD FOR AM BAND INTERFERENCE SUPPRESSION VIA FREQUENCY SHIFT

TECHNICAL FIELD

The present invention generally relates to motor vehicle data bus electronics, and more particularly relates to suppressing interference in amplitude modulation radio frequency band electronics used in conjunction with a data bus system in a motor vehicle.

BACKGROUND

Motor vehicles employ switching power supplies that utilize pulse width modulation to convert the stock vehicle voltage from the vehicle power supply (usually twelve volts) to whatever particular voltage levels are required to run the various electronic modules connected to the power supplies. The switching power supplies operate by switching on and off at a certain operating frequency; the output voltage from a power supply is determined by the duty cycle of the switched voltage.

Motor vehicle switching power supplies nominally operate in the frequency range from about 20 to 500 kilohertz (kHz). The frequencies at which the power supplies operate are chosen based on considerations such as efficiency of operation, heating, and the like. The frequencies are also chosen such that they do not cause harmful interference with the many electronic modules in the motor vehicle; however, the harmonics (whole-number multiples of the operating frequencies) generated by the power supplies may still cause interference with some of the electronic modules. The amplitude modulation (AM) band of automotive radios is particularly susceptible to interference from switching power supply operating frequency harmonics, because the AM frequency band extends from 520 (kHz) to 1710 kHz and the low-order harmonics generated by the switching power supplies fall into the AM band frequency range. A switching power supply operating at 200 kHz may cause interference for AM radio stations at 600 kHz (the power supply's third harmonic), 800 kHz (the fourth harmonic), and so forth. Because AM radios have a ten kHz resolution, meaning that they are calibrated to tune in steps of ten kHz, radio interference is experienced whenever a power supply harmonic is within plus or minus five kHz of the frequency to which the radio is tuned.

Accordingly, it is desirable to provide a method for AM band radio interference suppression that overcomes the interference problems attendant with prior art motor vehicles. Furthermore, other desirable features and characteristics of the present invention will become apparent from the subsequent detailed description and the appended claims, taken in conjunction with the accompanying drawings and the foregoing technical field and background.

BRIEF SUMMARY

Methods are provided for suppressing interference in a motor vehicle radio from the operating frequency or the harmonics of the operating frequency of a time varying signal present in the motor vehicle electronics in response to tuning the radio to a selected frequency. The method comprises the steps of communicating the selected frequency to the source of the time varying signal, comparing the selected frequency to the operating frequency and to the harmonics of that operating frequency, and adjusting the operating frequency if the operating frequency or any of the harmonics of the operating frequency fall within a predetermined interference range of the selected frequency.

BRIEF DESCRIPTION OF THE DRAWINGS

The present invention will hereinafter be described in conjunction with the following drawing figures, wherein like numerals denote like elements, and wherein FIG. 1 schematically illustrates a series of linked electronic modules in accordance with one embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In accordance with one embodiment of the invention, a method is provided that avoids operating motor vehicle electronics at a frequency at which the operating frequency or its harmonics of time varying signals used in or generated by those motor vehicle electronics can cause interference with the reception of radio signals and especially amplitude modulation (AM) band frequencies selected by a vehicle radio. Interference can result from the operating frequency or harmonics of the operating frequency of any motor vehicle electronics falling within a certain range of a frequency to which the vehicle radio is tuned. To suppress such interference, when tuned to a radio station, the vehicle radio sends a signal to the vehicle's electronics indicating to them the frequency to which the radio is tuned. If any of the electronics is operating at a frequency that itself or whose harmonics could cause interference with the radio's reception of the selected radio frequency, the interference-causing electronics shifts its frequency of operation. By shifting the operating frequency of the interfering switching power supply up or down by a small amount, the operating frequency or the harmonics of that operating frequency will no longer be within the tuned range of the selected radio frequency and the interference will be suppressed.

Figure 1:
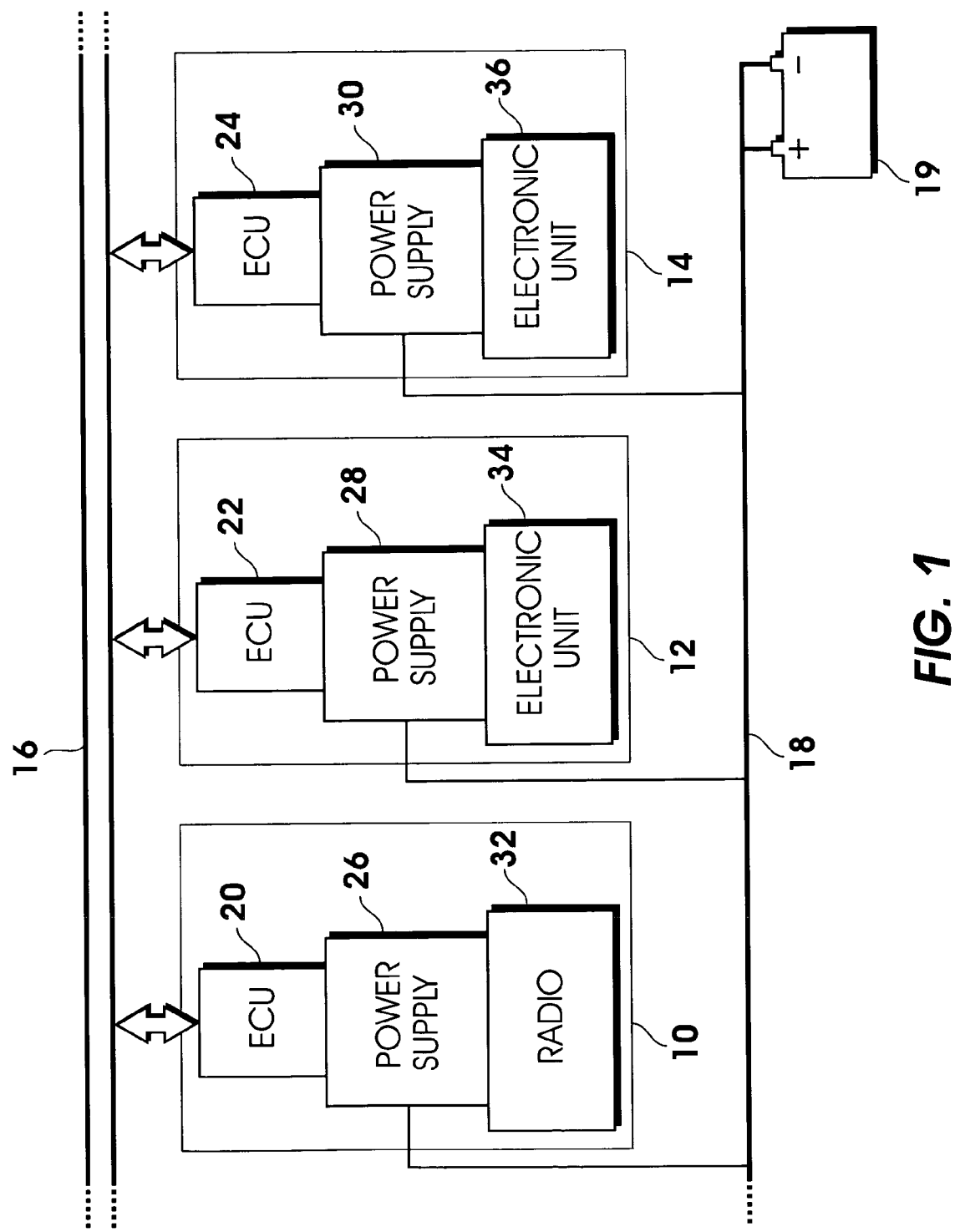

FIG. 1 illustrates a number of electronic modules 10, 12, and 14 coupled together in accordance with an embodiment of the invention. For ease of illustration, but without intent to limit the invention, in the following description the motor vehicle electronics will be referred to as switching power supplies and motor vehicle radios will be referred to as AM radios. Those of skill in the art will recognize that motor vehicle electronics typically involve a number of switching power supplies, but that other motor vehicle electronics besides switching power supplies are also potential sources of interfering frequencies. Although the problem of interference with radio reception is particularly troublesome for AM radio reception, the potential problem also exists for any radio reception. One of the electronic modules, module 10 for example, can include a vehicle radio. The remaining electronic modules can be related, for example, to display units, anti-lock brake controllers, or other electronic functions now commonly found on motor vehicles. In accordance with an embodiment of the invention, the electronic modules are coupled to a data bus 16 and to a wiring harness 18. Although only three electronic modules are illustrated in FIG. 1, a vehicle electronics system may have any number of such electronic modules. Data bus 16 is preferably a serial data bus and may be implemented as a local area network (LAN) or the like. Wiring harness 18 is provided for the distribution of direct current (DC) power from vehicle power supply 19 which can be, for example, the vehicle 12 volt battery. Each of electronic modules 10, 12, and 14 comprises an electronic control unit (ECU) 20, 22, and 24, a switching power supply 26, 28, and 30, and an electronic unit 32, 34, and 36, respectively. The electronic unit is the radio, electronic display unit, anti-lock brake controller, or the like that performs some function in the operation or enjoyment of the motor vehicle. Switching power supplies 26, 28, and 30 are coupled to and receive the DC voltage distributed by wiring harness 18 and, using pulse width modulation (PWM), convert the stock vehicle voltage to the correct voltage needed to run each individual electronic module. In accordance with an embodiment of the invention, the switching power supplies are each designed to operate with an operating frequency that falls within the range of about 20 kHz to 500 kHz. The ECUs in each electronic module control, at least in part, the operation of the electronic units in the corresponding module and, as will be explained more fully below, control the operating frequency of the switching power supplies. Data bus 16 is coupled to each of electronic control units 20, 22, and 24 and allows the ECUs to send and receive communication signals over the data bus. The various ECUs and switching power supplies illustrated need not all be the same, but rather can be specified for compatibility with the electronic unit with which they are associated. The ECUs can be microcontrollers or the like programmed in conventional manner as is known to those of skill in the art. Each of the switching power supplies is configured to provide the voltage level needed by its associated ECU and electronic unit.

In accordance with the illustrated embodiment, electronic unit 32 in electronic module 10 is a radio capable of receiving amplitude modulation (AM) band frequencies in the range from 520 kHz to 1710 kHz. The frequency to which the radio is tuned may be adjusted either manually or automatically using "scan" or "seek" features. The scan and seek features are common to conventional motor vehicle radios and need not be described in detail as such features are well know to those familiar with motor vehicle radios.

Figure 2:
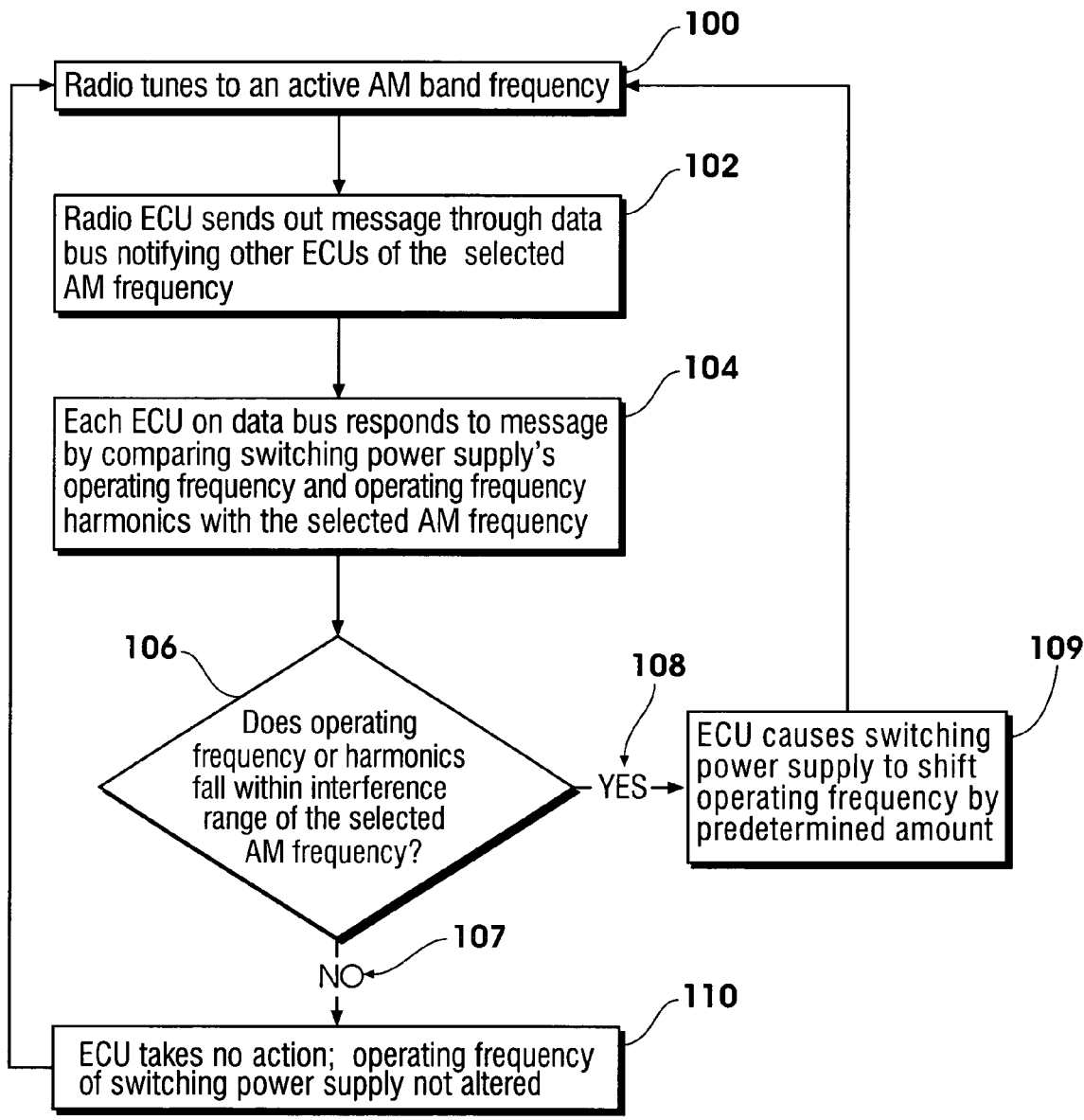
FIG. 2 schematically illustrates a process in accordance with an embodiment of the invention in flow chart form.

A method for suppressing radio interference and particularly AM band interference in motor vehicle radios, in accordance with an embodiment of the invention, can be understood by reference to FIG. 2 and with continued reference to FIG. 1. When radio 32 is tuned to an active radio station and preferably to an AM band frequency (step 100), radio ECU 20 communicates with the other electronic module ECUs coupled to data bus 16 by sending a message on the data bus informing the other electronic module ECUs of the selected frequency to which the radio is tuned (step 102). An "active AM band frequency" is defined herein as a frequency at which there is sufficient signal strength such that the radio is able to render useful audio at that frequency. The message sent by ECU 20 can include a data field containing the frequency information. The message can be constructed and sent on the data bus in a known manner. In response to receiving the message from ECU 20, each ECU coupled to the data bus (including radio ECU 20) compares the selected frequency to which the radio is tuned to the operating frequency and the associated harmonics generated by the switching power supply to which the particular ECU is coupled (step 104). In more general terms, each ECU compares the selected frequency to the operating frequency or its harmonics of any time varying signals used in or generated by the associated electronic module. The ECU determines whether the operating frequency or the harmonics from the switching power supply to which the ECU is coupled fall within a predetermined "interference range" (for example, plus or minus about five kHz) of the selected AM radio frequency (step 106). If an ECU determines that its switching power supply is operating at a frequency whose operating frequency or harmonics fall within the "interference range" of the selected AM radio frequency (step 108), and thus may cause unwanted interference with the reception of the selected AM radio station broadcasting at the selected frequency, the ECU causes the switching power supply to either increment or decrement the operating frequency of the switching power supply by some predetermined "shift" amount (for example, about three kHz) sufficient to insure that the shifted frequency and the associated harmonics will not fall within the interference range of the selected frequency (step 109). Shifting the operating frequency of the potentially interference-causing switching power supply also shifts the harmonic frequencies generated by the switching power supply so that the potentially interference causing operating frequency or harmonic frequency now falls outside the "interference range" of the selected AM radio frequency. The ECU chooses to either increment or decrement the operating frequency of the switching power supply based on whether the potentially interfering operating frequency or harmonic frequency from the switching power supply is above or below the selected AM radio frequency. The ECU chooses to decrement the operating frequency when the potentially interference-causing operating frequency or harmonic frequency is less than the selected AM radio frequency and to increment the operating frequency when the potentially interference-causing operating frequency or harmonic frequency is greater than the selected AM radio frequency. In a preferred embodiment of the invention, the ECU causes the operating frequency of the switching power supply to decrement, providing such decrementing of the operating frequency by the predetermined shift amount causes the operating frequency or the harmonic frequency to be outside the interference range of the selected AM radio frequency. Because the "scan" feature of motor vehicle radios normally increments the radio frequency in searching for an active AM band frequency, decrementing the operating frequency of an interference-causing switching power supply helps prevent future interference as the scan function tunes the radio to higher frequencies. If an ECU determines that the operating frequency or the harmonic frequencies from the switching power supply do not fall within the interference range of the selected AM radio frequency (step 107), the ECU in the electronic control module takes no action and does not altering the operating frequency of the switching power supply (step 110).

The following non-limiting example (with continued reference to FIG. 1) further serves to illustrate interference suppression in a motor vehicle AM radio in accordance with an embodiment of the invention. Radio 32 is tuned to 910 kHz while switching power supplies 26 and 30 each operate at a frequency of 210 kHz and switching power supply 28 operates at a frequency of 303 kHz. The predetermined interference range is set to plus or minus five kHz, and the predetermined increment/decrement shift amount is set to three kHz. In this example 910 kHz is an active AM band frequency, so radio 32 is capable of rendering audio from the signal at that frequency. Once the radio is tuned to the selected frequency, ECU 20 sends out a signal on data bus 16 informing all other ECUs coupled to the data bus that the radio is tuned to a signal at 910 kHz. ECU 20 then compares the operating frequency (210 kHz) of switching power supply 26 and the harmonics generated by the power supply operating at that operating frequency (420 kHz, 630 kHz, 840 kHz, 1050 kHz, and so forth) to the selected AM frequency of 910 kHz. The operating frequency and all of its harmonics fall outside the interference range, so ECU 20 does not alter the operating frequency of switching power supply 26. When ECU 22 receives the message from ECU 20, ECU 22 compares the operating frequency of switching power supply 28 (303 kHz) and the harmonics generated by the power supply operating at that operating frequency to the selected AM frequency of 910 kHz. The third harmonic (909 kHz) from switching power supply 28 falls within the interference range, so ECU 22 causes switching power supply 28 to lower its operating frequency by three kHz. Switching power supply 28 now operates at an operating frequency of 300 kHz, and the third harmonic (900 kHz) from the operating frequency is now outside the interference range. When ECU 24 receives the message from ECU 20, ECU 24 compares the operating frequency of switching power supply 30 and the harmonics generated by the power supply operating at that operating frequency to the selected AM frequency of 910 kHz. The operating frequency and the harmonics from the operating frequency do not fall within the interference range, so ECU 24 does not alter the frequency of switching power supply 30.

While at least one exemplary embodiment has been presented in the foregoing detailed description, it should be appreciated that a vast number of variations exist. It should also be appreciated that the exemplary embodiment is only an example, and is not intended to limit the scope, applicability, or configuration of the invention in any way. Rather, the foregoing detailed description will provide those skilled in the art with a convenient road map for implementing the exemplary embodiment. For example, other sources of time varying signals found in motor vehicles, in addition to switching power supplies, may be tuned, in accordance with the invention, to suppress radio interference that may result from the operating frequency of source or any harmonics of that operating frequency. Further, the invention is not limited to suppressing interference with AM radio reception, but may also be applied to suppressing interference with other radio reception providing an appropriate frequency shift is employed. It should be understood that various changes can be made in the function and arrangement of elements without departing from the scope of the invention as set forth in the appended claims and the legal equivalents thereof.

What is claimed is:

1. A method for suppressing interference in a motor vehicle radio from the operating frequency or the harmonics of the operating frequency of a source of time varying signal in response to tuning the radio to a selected frequency, the method comprising the steps of:
   communicating the selected frequency to the source of time varying signal;
   comparing the selected frequency to the operating frequency and to the harmonics of that operating frequency; and
   adjusting the operating frequency if the operating frequency or any of the harmonics of the operating frequency fall within a predetermined interference range of the selected frequency.

2. The method of claim 1 wherein the step of communicating comprises the step of sending a message from the radio to the source of time varying signal over a data bus.

3. The method of claim 2 wherein the step of communicating comprises the step of sending a message over a serial data bus.

4. The method of claim 1 wherein the motor vehicle radio comprises an AM radio and the step of communicating comprises the step of communicating a selected AM radio frequency to the source of time varying signal.

5. The method of claim 4 wherein the source of time varying signal comprises a switching power supply and the step of communicating comprises the step of communicating the selected AM radio frequency to the switching power supply.

6. The method of claim 5 wherein the step of comparing comprises the step of determining whether the operating frequency or any of the harmonics of the operating frequency are within about plus or minus 5 kHz of the selected frequency.

7. The method of claim 1 wherein the source of time varying signal comprises a switching power supply and the step of communicating comprises the step of communicating a selected radio frequency to the switching power supply.

8. The method of claim 1 wherein the step of adjusting the operating frequency comprises incrementing or decrementing the operating frequency by an amount sufficient that the operating frequency and all of the harmonics of the operating frequency differ from the selected frequency by an amount greater than the predetermined interference range.

9. The method of claim 8 wherein the step of adjusting the operating frequency comprises the step of incrementing or decrementing the operating frequency by about 3 kHz.

10. A method for suppressing interference in a motor vehicle AM radio from frequencies generated by a plurality of electronic modules in the motor vehicle, each of the plurality of electronic modules comprising an electronic control unit and a source of time varying signal coupled to the electronic control unit and configured to operate at an operating frequency, the method operative in response to tuning the AM radio to a selected frequency comprising the steps of:
    sending a message from the AM radio to each of the electronic control units in each of the plurality of electronic modules communicating the selected frequency;
    comparing the selected frequency to the operating frequency of the source of time varying signal in each of the plurality of electronic modules and to the harmonics of each of the operating frequencies;
    adjusting the operating frequency of the source of time varying signal in any of the plurality of electronic modules for which the operating frequency or any harmonic of the operating frequency is within a predetermined interference range of the selected frequency; and
    leaving unadjusted the operating frequency of the source of time varying signal in any of the plurality of electronic modules for which the operating frequency and all harmonics of the operating frequency are different from the selected frequency by more than a predetermined interference range.

11. The method of claim 10 wherein the step of sending a message comprises sending a message from an electronic control unit coupled to the AM radio to each of the electronic control units in each of the plurality of electronic modules over a data bus coupling each of the electronic control units.

12. The method of claim 10 wherein the step of sending a message comprises sending a message from an electronic control unit coupled to the AM radio to each of the electronic control units in each of the plurality of electronic modules ova a serial data bus coupling each of the electronic control units.

13. The method of claim 10 wherein the step of comparing comprises the step of the electronic control unit in each of the plurality of electronic modules comparing the selected frequency to the operating frequency of the source of time varying signal coupled to that electronic control unit and to the harmonics of that operating frequency.

14. The method of claim 10 wherein the step of adjusting comprises the step of incrementing or decrementing the operating frequency of any of the sources of time varying signal in any of the plurality of electronic modules by about 3 kHz.

15. The method of claim 10 wherein the step of adjusting comprises the step of decrementing the operating frequency of any of the sources of time varying signal in any of the plurality of electronic modules by about 3 kHz.

16. The method of claim 10 wherein the step of comparing comprises comparing the operating frequency of a source of time varying signal coupled to and configured power the AM radio and the harmonics generated by that source of time varying signal with the selected frequency.

17. A method for suppressing interference in a motor vehicle AM radio from frequencies generated by a plurality of electronic modules in the motor vehicle, each of the plurality of electronic modules comprising an electronic control unit and a switching power supply coupled to the electronic control unit and configured to operate at an operating frequency, the method operative in response to tuning the AM radio to a selected frequency and comprising the steps of:

sending a message communicating the selected frequency from an electronic control unit coupled to the AM radio to the electronic control units in each of the plurality of electronic modules;

comparing in each of the plurality of electronic modules the selected frequency to the operating frequency of the switching power supply in that electronic module;

adjusting the operating frequency of the switching power supply in any of the plurality of electronic modules for which the operating frequency or any harmonic of the operating frequency is within a predetermined interference range of the selected frequency.

18. The method of claim 17 wherein the step of adjusting comprises the step of adjusting the operating frequency by an amount sufficient to insure that the operating frequency and any harmonic thereof differ from the selected frequency by an amount greater than the predetermined interference range.

* * * * *